United States Patent
Okuno et al.

(10) Patent No.: US 7,921,684 B2
(45) Date of Patent: Apr. 12, 2011

(54) MAGNET-HOLDING STRUCTURE FOR MAGNETIC POSITION DETECTOR AND STEERING LOCK APPARATUS

(75) Inventors: Masanari Okuno, Aichi (JP); Hiroyasu Hasegawa, Aichi (JP); Nobuhisa Inoue, Okazaki (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 567 days.

(21) Appl. No.: 11/843,353

(22) Filed: Aug. 22, 2007

(65) Prior Publication Data

US 2008/0047309 A1 Feb. 28, 2008

(30) Foreign Application Priority Data

Aug. 25, 2006 (JP) ................................. 2006-229599

(51) Int. Cl.
*B60R 25/02* (2006.01)
(52) U.S. Cl. .......................................... 70/186; 70/252
(58) Field of Classification Search .................. None
See application file for complete search history.

(56) References Cited

U.S. PATENT DOCUMENTS

| | | | | |
|---|---|---|---|---|
| 4,218,938 A * | 8/1980 | Hattori | ............................ | 475/86 |
| 4,761,645 A * | 8/1988 | Mochida | ...................... | 340/5.62 |
| 4,854,410 A * | 8/1989 | Kanazawa et al. | ............ | 180/415 |
| 5,097,918 A * | 3/1992 | Daido et al. | .................. | 180/446 |
| 6,124,709 A | 9/2000 | Allwine | | |
| 6,189,919 B1 * | 2/2001 | Sinnhuber et al. | ............ | 280/731 |
| 6,492,807 B2 * | 12/2002 | Spellman | ................. | 324/207.22 |
| 6,571,587 B2 * | 6/2003 | Dimig et al. | .................... | 70/186 |
| 7,086,256 B2 * | 8/2006 | Hasegawa | ....................... | 70/186 |
| 7,111,480 B2 * | 9/2006 | Dimig et al. | .................... | 70/186 |
| 7,140,213 B2 | 11/2006 | Feucht et al. | | |
| 7,151,324 B2 * | 12/2006 | Neuhoff et al. | .............. | 307/10.2 |
| 7,251,968 B2 * | 8/2007 | Hasegawa | ....................... | 70/186 |
| 7,310,979 B2 * | 12/2007 | Hasegawa | ....................... | 70/186 |
| 7,328,596 B2 | 2/2008 | Hasegawa et al. | | |
| 7,475,577 B2 * | 1/2009 | Taniguchi et al. | ............. | 70/186 |
| 7,703,309 B2 * | 4/2010 | Okuno et al. | .................. | 70/186 |
| 7,714,459 B2 * | 5/2010 | Hirche et al. | ................. | 307/10.2 |
| 2008/0028806 A1 * | 2/2008 | Fort et al. | ......................... | 70/186 |
| 2008/0098777 A1 * | 5/2008 | Tanioka et al. | .................. | 70/184 |
| 2008/0178643 A1 * | 7/2008 | Okuno et al. | .................. | 70/184 |
| 2009/0133452 A1 * | 5/2009 | Hirche et al. | ................... | 70/183 |
| 2010/0083716 A1 * | 4/2010 | Fukatsu et al. | .................. | 70/186 |

FOREIGN PATENT DOCUMENTS

| | | |
|---|---|---|
| EP | 07016360.5 | 12/2007 |
| JP | 2006-36110 A | 2/2006 |

* cited by examiner

*Primary Examiner* — Suzanne D Barrett
(74) *Attorney, Agent, or Firm* — Saul Ewing LLP (57) ABSTRACT

A steering lock apparatus for locking a steering shaft of a vehicle. The steering lock apparatus includes a motor and a lock assembly that is moved by the motor. The lock assembly includes a lock bar that moves between a lock position at which the lock bar is engaged with the steering shaft and an unlock position at which the lock bar is disengaged from the steering shaft. A magnet receptacle portion is arranged on the lock assembly. A magnet is attached to the magnet receptacle portion and moved integrally with the lock assembly. A magnetic field detection element detects a present position of the lock assembly based on a magnetic field of the magnet. The magnet is magnetically held and positioned in the magnet receptacle portion by magnetic attraction force produced between the magnet and a part of the lock assembly.

18 Claims, 5 Drawing Sheets

MAGNET-HOLDING STRUCTURE FOR MAGNETIC POSITION DETECTOR AND STEERING LOCK APPARATUS

CROSS-REFERENCE TO RELATED APPLICATIONS

This application is based upon and claims the benefit of priority from prior Japanese Patent Application No. 2006-229599, filed on Aug. 25, 2006, the entire contents of which are incorporated herein by reference.

BACKGROUND OF THE INVENTION

The present invention relates to a magnet-holding structure for a magnetic position detector in which a magnetic field detection element detects a magnetic field produced by a magnet to determine a position, and more particularly, to a structure for holding a magnet that is used with a steering lock apparatus.

A steering lock apparatus has been conventionally mounted on a vehicle. The steering lock apparatus locks the steering wheel when the vehicle is parked so that the steering wheel cannot be rotated. This prevents the vehicle from being stolen by a third party. A conventional mechanical steering lock apparatus mechanically locks and unlocks the steering wheel when the driver inserts a vehicle key into the key cylinder, which is located near the steering wheel, and turns the vehicle key. This linearly moves a lock bar between two positions with a drive source, such as a motor, so as to lock or unlock the steering wheel.

More specifically, the electric steering lock apparatus includes a position detector. The position detector detects whether the lock bar has moved to a lock position or an unlock position. One conventional example of the position detector is a magnetic position detector. The conventional magnetic position detector may include a magnet and a Hall device (refer to Japanese Laid-Open Patent Publication No. 2006-36110). The conventional magnetic position detector may include a sintered magnet that is attached to a lock bar. The Hall device detects a change in the intensity of a magnetic field produced by the sintered magnet and detects the position of the lock bar.

SUMMARY OF THE INVENTION

Figure 8:
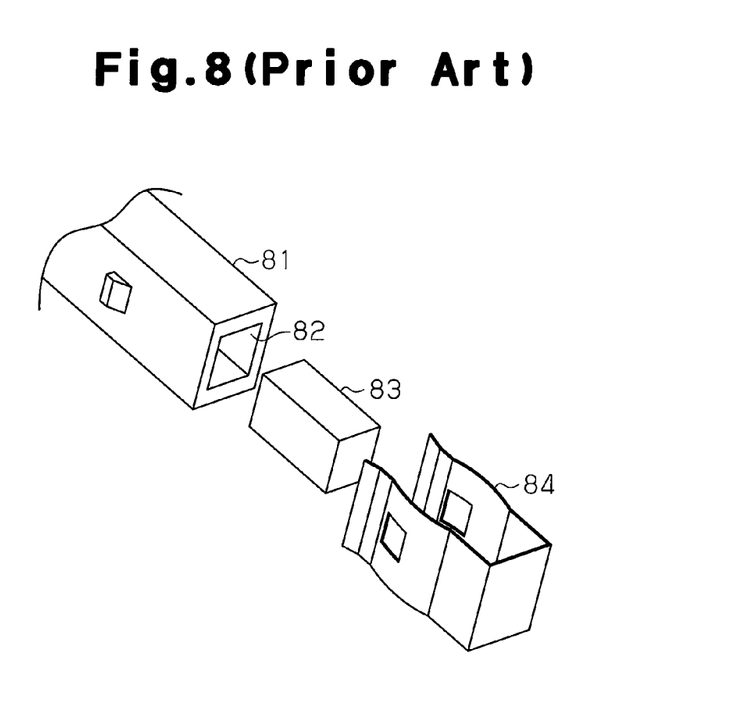
FIG. 8 is a perspective view showing a structure for holding a magnet with a lock stopper in the prior art.

FIG. 8 shows a conventional magnet-holding structure. A lock stopper 81 supports a lock bar (not shown). An accommodation socket 82 is formed in the lock stopper 81 to accommodate a magnet 83. A U-shaped magnet cover member 84, which is formed by bending a metal plate, is attached to the lock stopper 81. The metal plate is made of, for example, copper. The magnet cover member 84 prevents the magnet 83 from falling out of the accommodation socket 82. However, the magnet cover member 84, which is an essential component of the magnet-holding structure, increases the cost of components of the magnet-holding structure as well as the assembling cost of the magnet holding components. Thus, there is a need to reduce the number of components used to hold the magnet 83.

It is an object of the present invention to provide a magnet-holding structure for a magnetic position detector that includes fewer components for fixing the magnet. It is another object of the present invention to provide a steering lock apparatus that incorporates such a magnet-holding structure.

One aspect of the present invention is a magnet-holding structure for a magnetic position detector. The magnetic position detector includes a movable member, a support member for supporting the movable member, and a magnet attached to one of the movable member and the support member. A magnetic field detection element is arranged on the other one of the movable member and the support member to detect a magnetic field of the magnet. A position of the movable member with respect to the support member is magnetically detected based on an intensity or a direction of the magnetic field detected by the magnetic field detection element. The magnet-holding structure includes a magnet receptacle portion, arranged on the one of the movable member and the support member, for accommodating the magnet. The magnet receptacle portion is formed from a metal material or the one of the movable member and the support member includes a metal component or metal portion formed from a metal material near the magnet receptacle portion. The magnet is magnetically held and positioned in the magnet receptacle portion by a magnetic attraction force produced between the magnet and at least one of the magnet receptacle portion and the metal component or metal portion formed from the metal material.

A further aspect of the present invention is a steering lock apparatus including a locked member, a lock member that is engaged with and disengaged from the locked member, a support member for supporting the lock member, and a magnet attached to one of the lock member and the support member. A magnetic field detection element, arranged on the other one of the lock member and the support member, detects a magnetic field of the magnet. A position of the lock member with respect to the support member is magnetically detected based on an intensity or a direction of the magnetic field detected by the magnetic field detection element. A magnet receptacle portion is arranged on the one of the lock member and the support member to hold the magnet. The magnet receptacle portion is formed from a metal material or the one of the lock member and the support member includes a metal component or metal portion formed from a metal material near the magnet receptacle portion. The magnet is magnetically held and positioned in the magnet receptacle portion by a magnetic attraction force produced between the magnet and at least one of the magnet receptacle portion and the metal component or metal portion formed from the metal material.

Another aspect of the present invention is a steering lock apparatus for locking a steering shaft. The steering lock apparatus includes a motor and a lock assembly that is moved by the motor. The lock assembly includes a lock bar that moves between a lock position at which the lock bar is engaged with the steering shaft and an unlock position at which the lock bar is disengaged from the steering shaft. A magnet receptacle portion is arranged on the lock assembly. A magnet is attached to the magnet receptacle portion and moved integrally with the lock assembly. A magnetic field detection element detects a present position of the lock assembly based on a magnetic field of the magnet. The magnet is magnetically held and positioned in the magnet receptacle portion by a magnetic attraction force produced between the magnet and a part of the lock assembly.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A magnetic position detector, a magnet-holding structure, and a steering lock apparatus according to a preferred embodiment of the present invention will now be described with reference to FIGS. 1 to 4.

Figure 1:
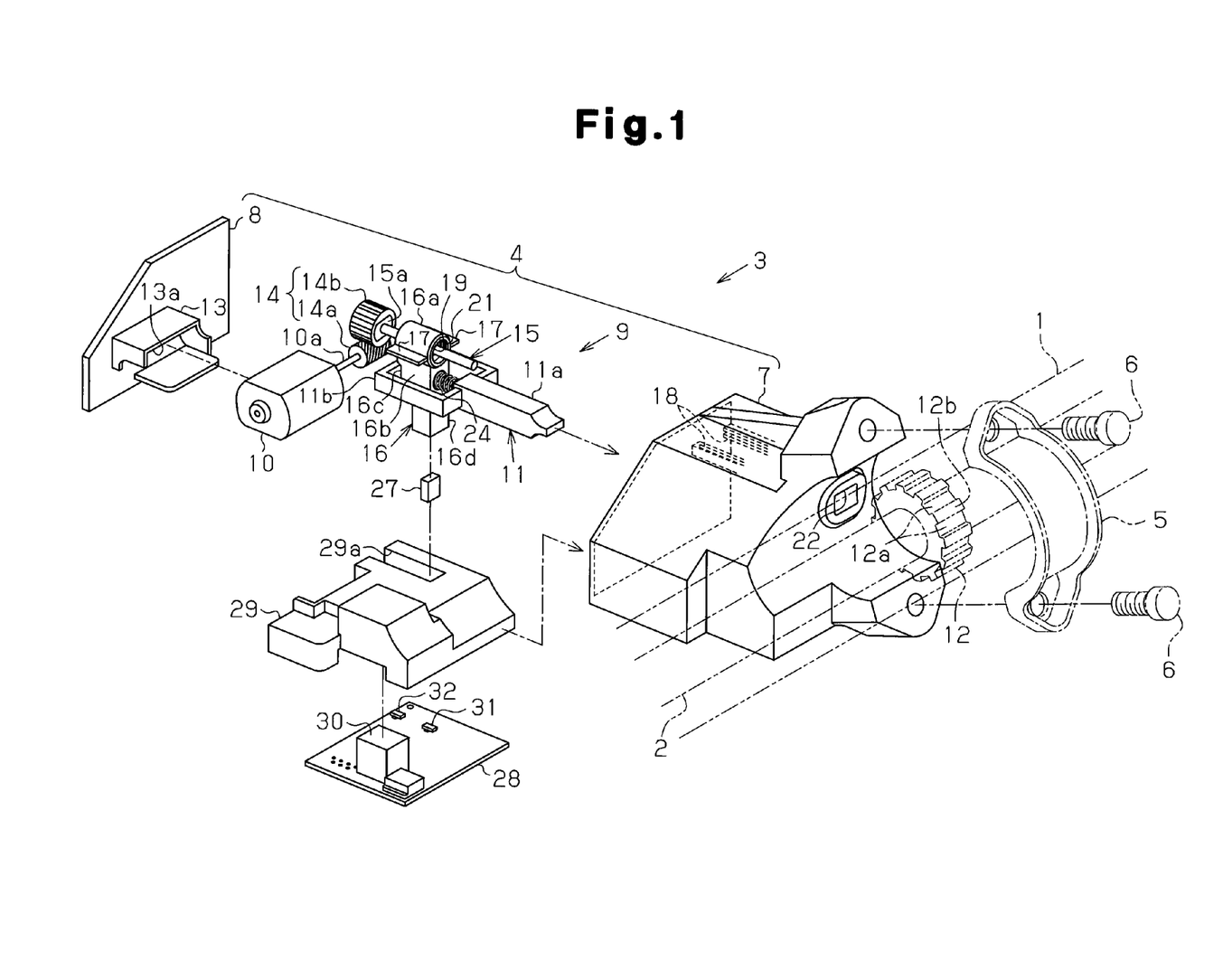
FIG. 1 is an exploded perspective view showing a steering lock apparatus according to a preferred embodiment of the present invention.

FIG. 1 shows a column tube 1, which is arranged in front of a driver seat in a vehicle, such as an automobile. The column tube 1 can be made of synthetic resin. The column tube 1 accommodates a steering shaft 2 in a rotatable manner. The steering shaft 2 is connected to a steering wheel (not shown). When the driver rotates the steering wheel, the steering shaft 2 rotates and steers wheels (not shown).

A steering lock apparatus 3, which functions as a vehicle anti-theft apparatus, is mounted on the column tube 1. The steering lock apparatus 3 locks and prohibits rotation of the steering wheel. This prevents the vehicle from being stolen by a third party. The steering lock apparatus 3 shifts to an unlock state when, for example, a start switch (not shown) is operated in a state in which the gearshift lever (not shown) is located at the parking position and the brake pedal (not shown) is being depressed. The steering lock apparatus 3 shifts to a lock state when, for example, the driver gets out of the vehicle and closes the door.

The column tube 1 is arranged between a case 4 and a bracket 5. The case 4, which can be made of synthetic resin, is fastened to the bracket 5 with a plurality of screws 6. This fixes the steering lock apparatus 3 to the column tube 1.

The case 4 includes a case body 7 and a cover 8. The case body 7 includes an opening through which electrical and mechanical components of the steering lock apparatus are inserted. The cover 8, which can be formed by a flat plate, closes the opening of the case body 7. The case 4 is one example of a support member.

The case body 7 accommodates a lock mechanism 9 of the steering lock apparatus 3. The lock mechanism 9 includes a motor 10 and a lock bar 11. The lock bar 11 moves between a lock position and an unlock position when the motor 10 is driven. A seat member 12, functioning as a locked member, is arranged on the steering shaft 2. The lock bar 11 has a distal end that is engaged with one of a plurality of valleys 12a of the seat member 12 when the steering lock apparatus 3 is in the lock state. When the distal end of the lock bar 11 is disengaged from the valley 12a, the steering lock apparatus 3 is in the unlock state.

Four support plates 13 arranged on the inner surface of the cover 8 form an accommodation socket 13a. The motor 10 is completely or partially accommodated in the accommodation socket 13a. To prevent enlargement of the steering lock apparatus 3, it is preferable that the motor 10 laterally extends in the accommodation socket 13a. The steering lock apparatus 3 may be connected to a battery (direct current power supply) mounted on the vehicle. In this case, a DC motor may be used as the motor 10. The motor 10 is one example of an electric drive device.

A worm gear 14 includes a worm 14a and a worm wheel (helical gear) 14b. The worm 14a is fixed to a distal end of a rotation shaft 10a of the motor 10. The worm wheel 14b is fixed to a basal end of a transmission shaft 15. The worm gear 14 connects the rotation shaft 10a and the transmission shaft 15, which extend perpendicular to each other. The motor 10 is driven to rotate the transmission shaft 15. It is preferable that the transmission shaft 15 has a protrusion 15a on its basal end (refer to FIG. 2). The protrusion 15a ensures that the worm wheel (helical gear) 14b does not rotate in an idle manner. Bushings (not shown) rotatably support the two ends of the transmission shaft 15. The worm gear 14 may decelerate the rotation generated by the motor 10 and transmit the decelerated rotation of the motor 10 to the transmission shaft 15. This would still produce sufficient torque for linearly moving the lock bar 11 between two positions. The transmission shaft 15 forms a transmission mechanism and is one example of a metal component or metal portion that is formed from a magnetically attractive metal material, that is, a material that is attracted to a magnet.

The lock bar 11 is supported by a lock stopper 16. The lock stopper 16 is fixed to the transmission shaft 15 (refer to FIG. 2). It is preferable that the lock stopper 16 is formed from a magnetically non-attractive material, that is, a material that is neither attracted to nor repelled from a magnet. This is because when formed from a magnetically attractive material such as iron and steel, the lock stopper 16 would interfere with magnetic detection of the position of the lock bar 11. Examples of the magnetically non-attractive material include non-ferromagnetic materials, such as zinc.

The lock stopper 16 has a body 16a including two guide plates 17, which extend in the axial direction of the transmission shaft 15. Each guide plate 17 is received in a guide groove 18 (refer to FIG. 1), which is formed in the case body 7 in a movable manner. The guide plates 17 and the guide grooves 18 guide the lock stopper 16 when the lock stopper 16 moves in the axial direction of the transmission shaft 15 while preventing rotation of the lock stopper 16.

A through hole 19 including a female thread 21 extends through the body 16a of the lock stopper 16. The transmission shaft 15 includes a large diameter portion 15b, on which a male thread 20 is formed. The male thread 20 of the large diameter portion 15b is mated with the female thread 21 of the through hole 19. The worm gear 14, the guide plates 17, the guide grooves 18, the male thread 20, and the female thread 21 form the transmission mechanism.

To lock or unlock the steering wheel, the motor 10 is first activated to generate rotation. The worm gear 14 then transmits the rotation generated by the motor 10 to the transmission shaft 15. The male thread 20 of the transmission shaft 15 and the female thread 21 of the lock stopper 16 then convert the rotation of the transmission shaft 15 to linear movement of the lock stopper 16. The engagement of the guide plates 17 and the guide grooves 18 prevent the lock stopper 16 from rotating during the linear movement of the lock stopper 16. Thus, the lock stopper 16 slides in the axial direction of the transmission shaft 15.

Figure 2:
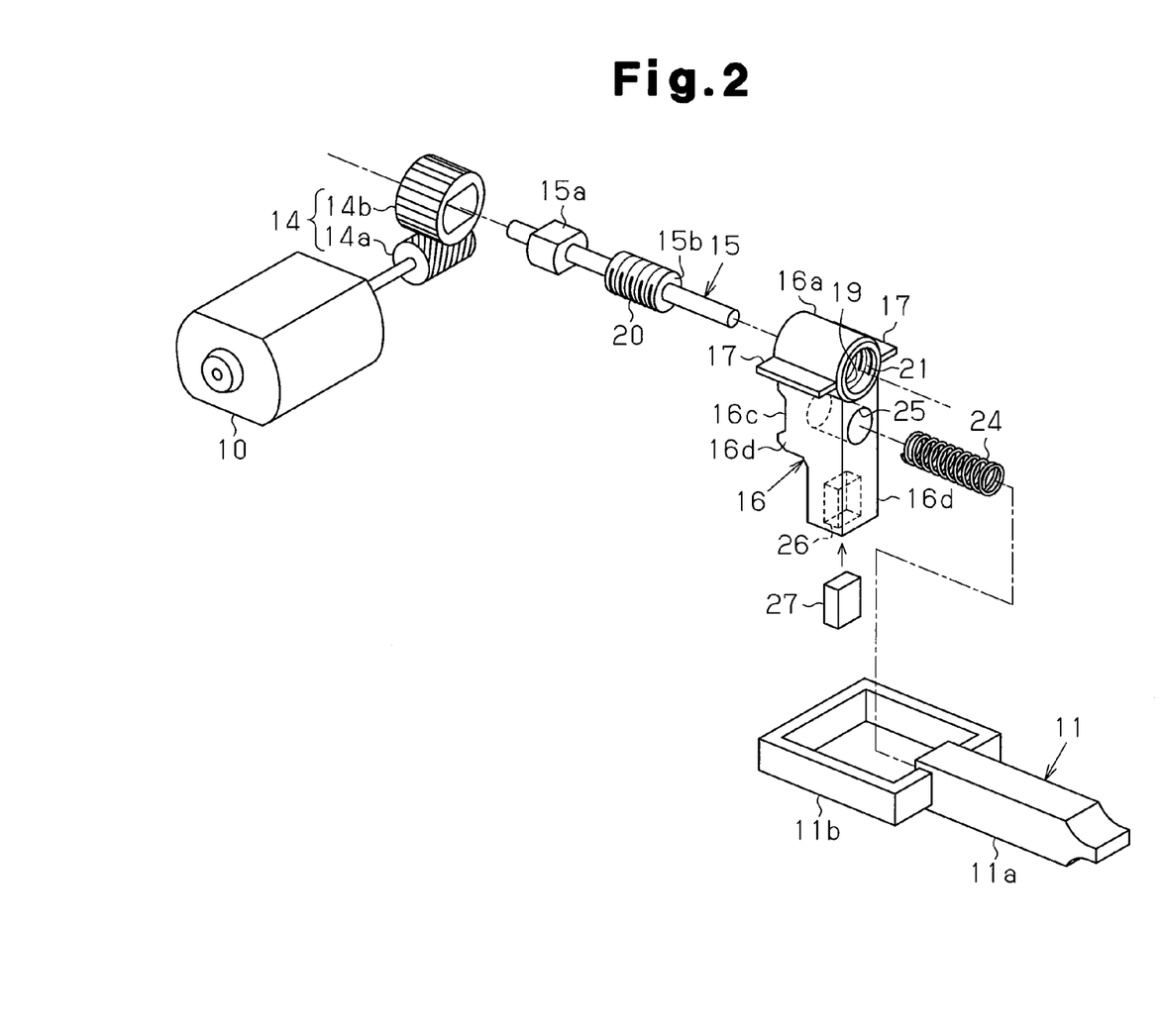
FIG. 2 is an exploded perspective view of a lock mechanism incorporated in the steering lock apparatus of FIG. 1.

The lock stopper 16 includes an extension 16b, which extends in a direction opposite to the transmission shaft 15 (in a downward direction in FIGS. 1 and 2). The lock bar 11 can be formed from a magnetically attractive metal material. The lock bar 11 may be formed, for example, from a ferromagnetic material, such as iron or iron alloy. The lock bar 11 has a distal portion 11a and a basal portion. The distal portion 11a of the lock bar 11 has the form of a rectangular block. The basal portion of the lock bar 11 if frame-shaped and defines a base frame 11b. When the lock bar 11 is at the lock position, the distal portion 11a is engaged with one valley 12a of the seat member 12. To fix the lock bar 11 to the lock stopper 16, the extension 16b is inserted through the base frame 11b. Then, part of the base frame 11b is received in a seat 16c formed on the lock stopper 16 (refer to FIG. 3).

Figure 3:
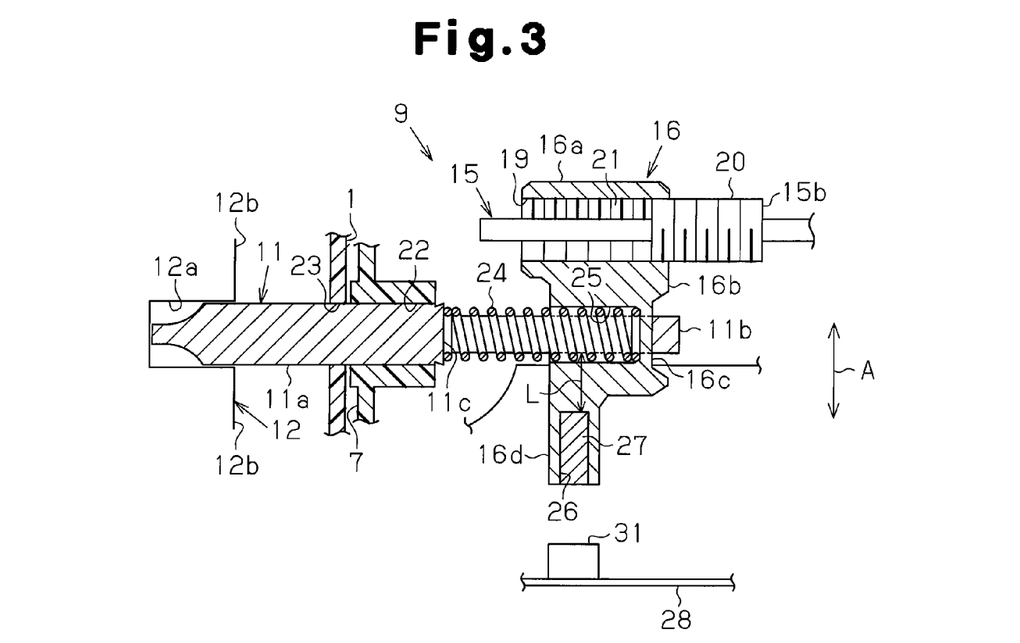
FIG. 3 is a cross-sectional view of the steering lock apparatus of FIG. 1 in a lock state.
Figure 4:
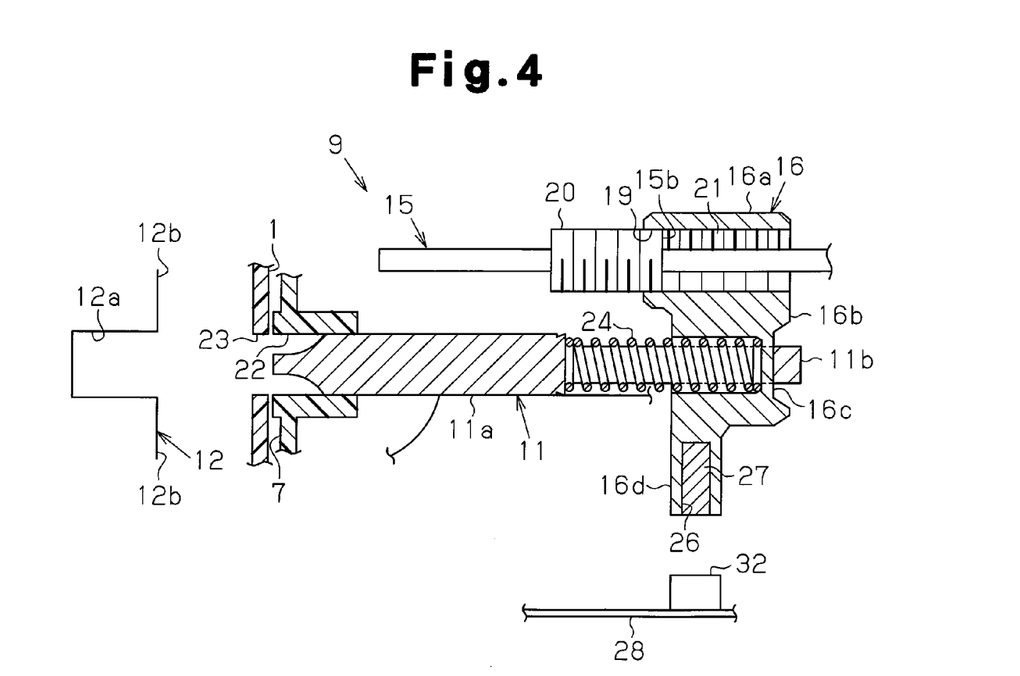
FIG. 4 is a cross-sectional view of the steering lock apparatus of FIG. 1 in an unlock state.

The distal portion 11a of the lock bar 11 extends out of the case body 7 through a window 22 and into the column tube 1 through a window 23 (refer to FIGS. 3 and 4). The lock bar 11 engages the seat member 12 through the windows 22 and 23 when the steering lock apparatus 3 is in the lock state.

A coil spring 24, which is in a compressed state, is arranged between the lock stopper 16 and the lock bar 11. The coil spring 24 can be formed, for example, from a magnetically attractive metal material. The coil spring 24 has one end accommodated in a spring hole 25. The spring hole 25 is formed in a side wall of the extension 16b. The coil spring 24 has another end contacting a surface 11c (refer to FIGS. 3 and 4) of the base frame 11b that faces the spring hole 25. The coil spring 24 biases the lock bar 11 toward the steering shaft 2. Thus, when the distal portion 11a of the lock bar 11 is arranged on a ridge 12b between two valleys 12a of the seat member 12, the coil spring 24 forces the distal portion 11a of the lock bar 11 into one of the valleys 12a. Although the coil spring 24 biases the lock bar 11 toward the steering shaft 2, the base frame 11b and the rear surface of the extension 16b contact each other and prevent excessive projection of the lock bar 11 toward the steering shaft 2. When the coil spring 24 is formed from a magnetically attractive metal material, the lock bar 11 may be formed from a magnetically non-attractive material, such as aluminum and zinc. When the lock bar 11 is formed from a magnetically attractive metal material, the coil spring 24 may be formed from a magnetically non-attractive material, such as copper.

FIG. 3 shows the steering lock apparatus 3 in a lock state. In the lock state, the distal portion 11a of the lock bar 11 is fitted into a valley 12a of the seat member 12 (lock position). FIG. 4 shows the steering lock apparatus 3 in an unlock state. In the unlock state, the distal portion 11a of the lock bar 11 is spaced from the valleys 12a of the seat member 12 (unlock position). The lock stopper 16 moves linearly as the motor 10 rotates. This also moves the lock bar 11, which is fixed to the lock stopper 16, linearly between the lock position and the unlock position.

As shown in FIG. 1, the lock stopper 16 includes a leg 16d. The leg 16d extends downward from the extension 16b, or away from the transmission shaft 15. As shown in FIGS. 2 to 4, the leg 16d has a magnet receptacle portion 26 for accommodating a magnet 27. The magnet 27, which is used to detect the position of the lock bar 11, is accommodated and fixed in the magnet receptacle portion 26. The magnet 27 may be a sintered magnet although it is not limited to a sintered magnet.

Electronic components including a steering lock ECU 30, which controls driving of the motor 10, are mounted on a circuit board 28. The circuit board 28 is separated from the lock stopper 16 (below the lock stopper 16 in FIG. 1). The circuit board 28 is covered by a circuit board cover 29. In a covered state, the circuit board 28 is accommodated in the case body 7. The circuit board cover 29 includes a guide slit 29a for accommodating the leg 16d of the lock stopper 16. The guide slit 29a extends in the moving direction of the lock stopper 16 (lock bar 11). The leg 16d, which is accommodated in the guide slit 29a, moves along the guide slit 29a as the lock stopper 16 moves.

Two Hall devices 31 and 32 are connected to the circuit board 28. The Hall devices 31 and 32 detect a magnetic field (the intensity or the direction of a magnetic field) produced by the magnet 27. As shown in FIG. 3, the Hall device 31 faces the magnet 27 when the lock bar 11 is at the lock position. As shown in FIG. 4, the Hall device 32 faces the magnet 27 when the lock bar 11 is at the unlock position. The Hall devices 31 and 32 each generate a detection signal that is in accordance with the intensity of the detected magnetic field and provide the detection signal to the steering lock ECU 30. The steering lock ECU 30 determines whether the lock bar 11 is located at the lock position or the unlock position based on the detection signals provided from the Hall devices 31 and 32.

The steering lock ECU 30 activates the motor 10 in response to a lock instruction provided from an external controller so that the motor 10 generates rotation in one direction until the lock bar 11 reaches the lock position. This shifts the steering lock apparatus 3 to the lock state. The steering lock ECU 30 activates the motor 10 in response to an unlock instruction provided from the external controller so that the motor 10 generates rotation in the other direction until the lock bar 11 reaches the unlock position. This shifts the steering lock apparatus 3 to the unlock state.

The layout of the components in the steering lock apparatus 3 will now be described with reference to FIGS. 3 and 4. Gravitational force acts to cause the magnet 27 to fall in the direction of axis A shown in FIG. 3. However, the steering lock apparatus 3 includes a metal component or metal portion formed from a magnetically attractive metal material and arranged above the magnet 27, that is, at a position in a direction opposite the falling direction of the magnet 27. In the illustrated example, the transmission shaft 15, the lock bar 11, and the magnet 27 are arranged in this order from above. The lock bar 11, which is formed from a magnetically attractive metal material, is arranged at a position in a direction opposite the falling direction of the magnet 27.

In this layout, the lock bar 11 is located near the magnet 27. The magnetic force of the magnet 27 results in the magnet 27 being attracted toward the lock bar 11. The magnetic attraction force between the magnet 27 and the lock bar 11 holds and positions the magnet 27 in the magnet receptacle portion 26 of the lock stopper 16. Distance L between the lock bar 11 and the magnet 27 is determined such that the magnetic attraction force prevents the magnet 27 from falling out of the magnet receptacle portion 26. If the lock stopper 16 is formed from a magnetically non-attractive material, the lock stopper 16 does not affect the attraction force of the magnet 27. In such a case, magnetic attraction force does not occur between the magnet 27 and the lock stopper 16.

The magnet-holding structure, in which the magnet 27 is magnetically attracted toward the lock bar 11 of the steering lock apparatus 3, enables simple attachment of the magnet 27 to the lock stopper 16. Further, the magnet-holding structure eliminates the need for a special component for attaching the magnet 27 to the lock stopper 16 (the magnet cover member 84 in FIG. 8). This eliminates the component cost and assembling cost of the conventional magnet cover member 84 and reduces the manufacturing cost of the steering lock apparatus 3.

In the magnet-holding structure of the present example, which uses magnetic force, relative positions of the magnet 27 and the magnet attractive component (the lock bar 11) are fixed and do not change. In other words, the magnetic attraction force produced between the magnet 27 and the component attracted by the magnet 27 remains unchanged. In such a case, the constant magnetic attraction force between the magnet 27 and the magnet attractive component does not affect the magnetic force relationship between the magnet 27 and the Hall device 31 or 32. This maintains position detection accuracy.

The base frame 11*b* of the lock bar 11 is arranged above the magnet 27. Thus, the magnet 27 is mainly attracted toward the base frame 11*b* of the lock bar 11 by its own magnetic force. The coil spring 24, which is formed from a magnetically attractive metal material, is arranged in the interior (cavity) of the base frame 11*b*, which is located above the magnet 27. The base frame 11*b* (the lock bar 11) and the coil spring 24 lie along the same plane.

Thus, the magnet 27 produces a magnetic attraction force acting between the magnet 27 and magnet attractive components, which are arranged along the same frame and include the magnet attractive component arranged in the cavity (the coil spring 24). This stably holds the magnet 27 even if the lock bar 11 includes the base frame 11*b*, which defines a cavity.

The lock bar 11, the lock stopper 16, and the coil spring 24 form a lock assembly. The lock assembly is moved by the motor 10. The lock bar 11 is one example of a movable member, part of the movable lock assembly, and a magnet attractive component or portion, and a lock member. The lock stopper 16 is one example of the movable member, part of the movable lock assembly, and a stopper unit. The coil spring 24 is one example of the movable member, part of the movable lock assembly, the magnet attractive component or portion, and a biasing member. The leg 16*d* or the magnet receptacle portion 26 is one example of a magnet receptacle portion. Each of the Hall devices 31 and 32 is one example of a magnetic field detection element.

The preferred embodiment has the advantages described below.

(1) The magnet-holding structure includes the lock bar 11. The lock bar 11 is arranged near the magnet 27, which is attached to the lock stopper 16. The lock bar 11 is formed from a metal material. The magnet 27 is magnetically attracted toward the lock bar 11. This eliminates the need for a special fastening component (the magnet cover member 84 in FIG. 8) for holding the magnet 27 on the lock stopper 16. The magnet-holding structure reduces the component cost and the assembling cost as compared with the prior art.

(2) In the magnet-holding structure, the magnet 27 and the lock bar 11, toward which the magnet 27 is attracted, form the lock assembly. The lock assembly moves integrally when the motor 10 is driven. Thus, the relative positions of the magnet 27 and the lock bar 11 remain the same before and after the motor 10 is driven. The magnetic force relationship between the magnet 27 and the Hall device 31 or 32 is constant before and after the lock bar 11 moves to, for example, the lock position or the unlock position. This maintains the detection accuracy of the position of the lock bar 11. The magnetic attraction force between the magnet 27 and the lock bar 11 remains the same regardless of the position of the lock bar 11. Thus, the magnet 27 is always held in the lock stopper 16 by a constant force, and it is unlikely that the magnet 27 will unexpectedly fall out of the lock stopper 16.

(3) The magnet 27 and the lock bar 11 are positioned so that a magnetic attraction force is produced between the magnet 27 and the lock bar 11. The lock bar 11 is formed from a magnetically attractive metal material, such as iron and steel, and is thus difficult to break. Thus, even if the steering wheel is improperly or forcibly turned when the steering lock apparatus is in the lock state, the lock bar 11 is prevented from being broken. The lock bar is normally formed from such a material. Therefore, there is no need for adding a new component for attraction to the magnet 27. Further, significant changes to the design of the lock bar 11 are not necessary. Accordingly, the magnet holding structure of the preferred embodiment is practical.

(4) The steering lock apparatus 3 operates electrically and shifts between the locking and unlock states without requiring force applied by an driver. Thus, it is required that movement of the lock bar 11 to the lock position, completion of the locking operation by the steering lock apparatus 3, movement of the lock bar 11 to the unlock position, and completion of the unlocking operation of the steering lock apparatus 3 are detected. The steering lock apparatus 3 includes the Hall devices 31 and 32 and the magnet 27 that perform such detection. The magnet-holding structure holds the magnet 27 in the lock stopper 16 without using a special fastening component (e.g., the magnet cover member 84 in FIG. 8). The magnet 27 and the magnet receptacle portion 26 are uncovered during operation of the steering lock apparatus 3. Thus, the magnet-holding structure of the present invention is particularly effective for use with the electric steering lock apparatus 3.

(5) The coil spring 24, which constantly biases the lock bar 11 toward the lock position, is arranged between the lock bar 11 and the lock stopper 16. Thus, even if the lock bar 11 is arranged on a ridge 12*b* of the seat member 12 when the steering lock apparatus 3 is shifting to the unlock state, the driver is simply required to slightly turn the steering wheel. As a result, the biasing force of the coil spring 24 forces the lock bar 11 into a valley 12*a* of the seat member 12.

(6) The layout of the lock bar 11, the coil spring 24, and the magnet 27 produces magnetic attraction force between the magnet 27 and the base frame 11*b* of the lock bar 11 and between the magnet 27 and the coil spring 24. This attaches the magnet 27 to the lock stopper 16 with a strong and stable magnetic attraction force and prevents the magnet 27 from falling off.

(7) The magnet-holding structure of the preferred embodiment magnetically holds the magnet 27. Thus, the dimensions of the magnet receptacle portion 26 may be determined such that the magnet 27 is either tightly fitted or loosely fitted in the magnet receptacle portion 26. Since highly accurate machining is not necessary, the lock stopper 16 has high productivity. In contrast, in a structure in which the magnet 27 is press-fitted into the lock stopper 16, a socket for receiving the magnet must be dimensioned with high accuracy to enable tight fitting of the magnet. This would be disadvantageous from the aspect of productivity.

It should be apparent to those skilled in the art that the present invention may be embodied in many other specific forms without departing from the spirit or scope of the invention. Particularly, it should be understood that the present invention may be embodied in the following forms.

Figure 5:
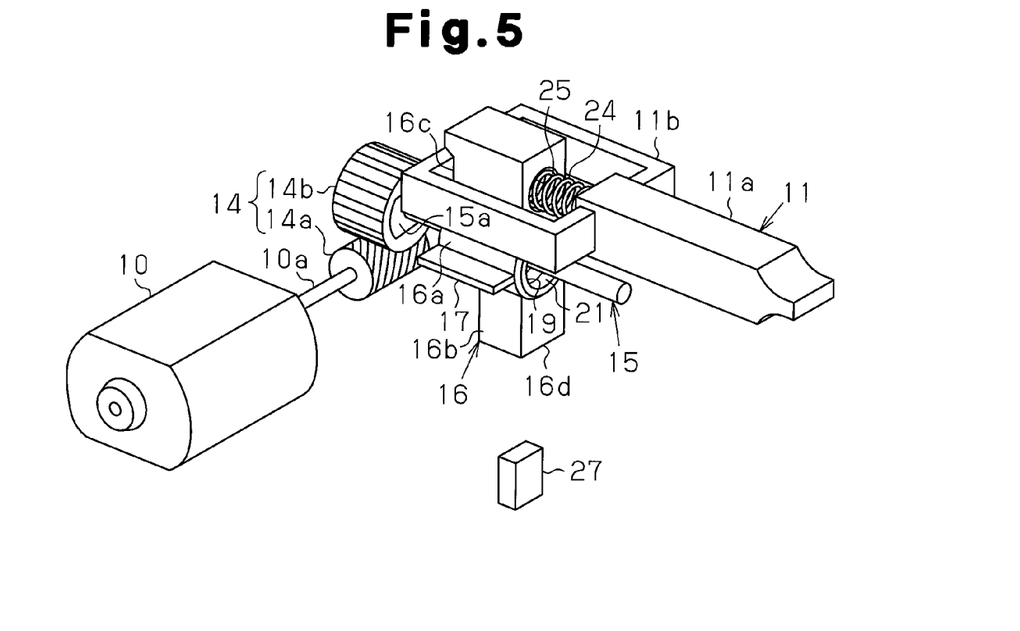
FIG. 5 is a perspective view showing a lock mechanism incorporated in a steering lock apparatus according to a first modification of the structure shown in FIG. 1.

In the magnet-holding structure, the component toward which the magnet 27 is attracted is not limited to the lock bar 11 or the coil spring 24. For example, the lock bar 11 (the coil spring 24) does not have to be arranged below the transmission shaft 15 and may be arranged above the transmission shaft 15 as shown in FIG. 5. In this case, the magnet 27 may be attracted toward the transmission shaft 15, which is formed from a magnetically attractive metal material.

Figure 6:
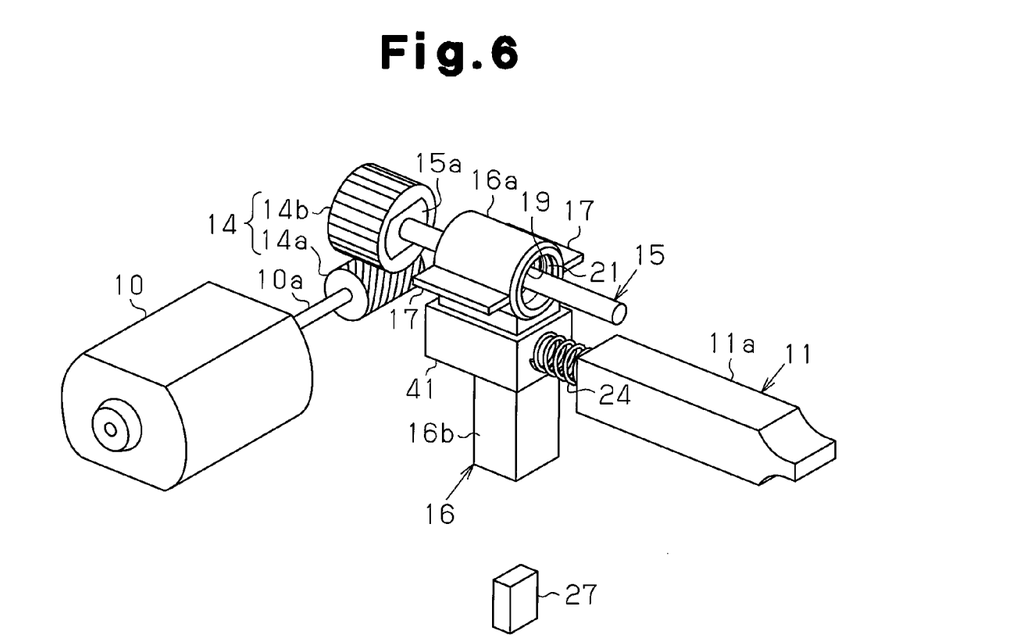
FIG. 6 is a perspective view showing a lock mechanism incorporated in a steering lock apparatus according to a second modification of the structure shown in FIG. 1.

In the magnet-holding structure, the component toward which the magnet 27 is attracted is not limited to the lock bar 11 and the transmission shaft 15. For example, as shown in FIG. 6, a support frame 41, which is formed from a magnetically attractive metal material, may support the lock stopper 16 on the lock bar 11. In this case, the magnet 27 may be attracted toward the support frame 41 and supported on the lock stopper 16. The support frame 41 is part of the lock stopper 16. The shape of the support frame 41 is not limited to a square frame and may have any shape, such as a U-shape.

Figure 7:
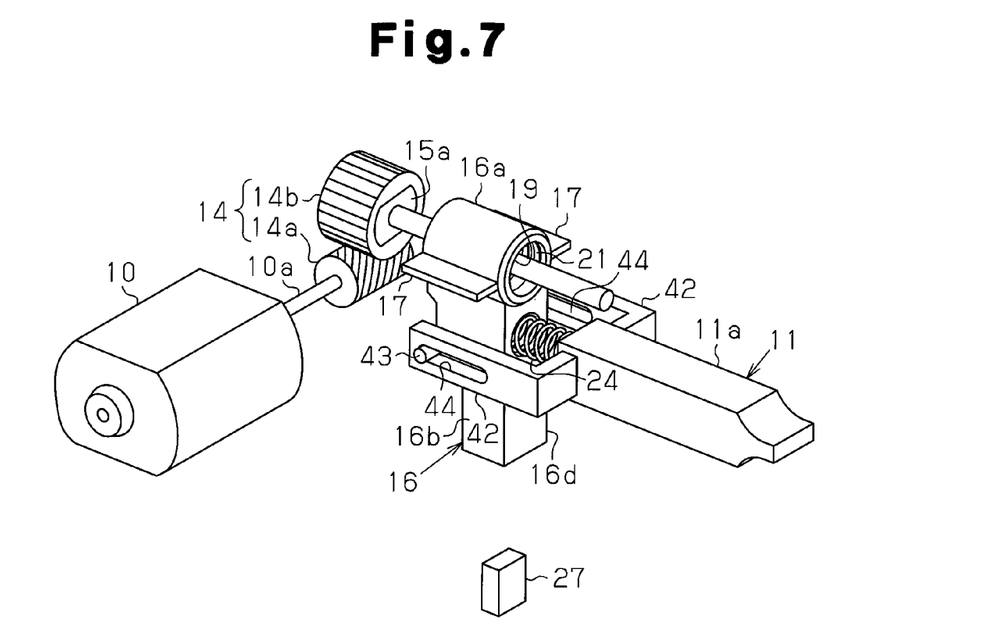
FIG. 7 is a perspective view showing a lock mechanism incorporated in a steering lock apparatus according to a third modification of the structure shown in FIG. 1.

The lock bar 11 does not have to include the base frame 11b, which has a square frame shape. In the example shown in FIG. 7, the lock bar 11 includes a U-shaped basal end in lieu of the base frame 11b. The U-shape basal end includes two pieces 42. Each of the two pieces 42 has an elongated hole 44. In this case, two pins 43 (only one shown in FIG. 7) of the lock stopper 16 are inserted in the corresponding elongated holes 44. This attaches the lock bar 11 to the lock stopper 16.

The movable lock assembly is not limited to the structure including the lock bar 11 and the lock stopper 16. For example, the biasing member for biasing the lock bar 11 toward the lock position and the lock stopper 16 may be eliminated. In this case, only the lock bar 11 is moved by the drive force of the motor 10. The magnet receptacle portion may be formed integrally with the lock bar 11.

The lock bar 11, the transmission shaft 15, and the coil spring 24, toward which the magnet 27 is attracted, are not limited to components that are entirely formed from a magnetically attractive metal material. It is only required, for example, that parts of these components toward which the magnet 27 is attracted are formed from a magnetically attractive metal material. For example, only a part of the lock bar 11 (e.g., only the base frame 11b) may be formed from a magnetically attractive metal material.

The lock stopper 16 may be entirely formed from a magnetically non-attractive material. Alternatively, the lock stopper 16 may be partially (only the leg 16d) formed from a magnetically non-attractive material.

The magnetic field detection element is not limited to the Hall devices 31 and 32. Instead, a magnetic resistor element for detecting the strength and/or the direction of a magnetic field of the magnet may be used as the magnetic field detection element.

The magnet 27 is not limited to the structure that is accommodated in the magnet receptacle portion 26, which is formed in the lock stopper 16. For example, the magnet 27 may be attached to the lock stopper 16 in a state exposed from the surface of the lock stopper 16. The magnet 27 does not have to be shaped as a box and may have any shape, such as a cylindrical shape or a square shape.

The electric drive device is not limited to the motor 10 and may be any drive source that can move the lock bar 11, such as a cylinder.

The transmission mechanism for transmitting the drive force of the motor 10 is not limited to the structure including the deceleration gear mechanism (the worm gear 14), which converts rotation of the motor 10 to linear movement and transmits the movement to the lock bar 11, the shaft mechanism (the transmission shaft 15), the screw mechanism (the threads 20 and 21), and the guide mechanism (the guide plates 17 and the guide grooves 18). More specifically, the transmission mechanism may have any structure as long as the lock bar 11 is linearly moved by the motor 10, which functions as a drive source.

When the transmission mechanism for converting rotation of the motor 10 to linear movement of the lock bar 11 with the threads 20 and 21 is used, the structure that allows linear movement of the lock stopper 16 and restricts rotation of the lock stopper 16 is not limited to the guide plates 17 and the guide grooves 18 and 18. For example, the upper surface of the lock stopper 16 may be flat and a support wall may extend in the movement direction of the lock bar 11 on the inner surface of the case 4. In this case, the support wall comes in contact with the upper surface of the lock stopper 16 so as to allow linear movement of the lock stopper 16 and restrict rotation of the lock stopper 16. This linearly moves the lock stopper 16.

The biasing member is not limited to the coil spring 24. For example, a plate spring or an elastic rubber may be used instead.

The steering lock apparatus is not limited to an electric apparatus and may be a mechanical apparatus in which the lock bar 11 is moved by an operation performed by the driver.

The magnetic position detector of the present invention is applicable to apparatuses other than the steering lock apparatus. The magnetic position detector is applicable to any apparatus that uses a magnetic position detector including a magnet and a Hall device.

The present examples and embodiments are to be considered as illustrative and not restrictive, and the invention is not to be limited to the details given herein, but may be modified within the scope and equivalence of the appended claims.

What is claimed is:

1. A magnet-holding structure for a magnetic position detector, the magnetic position detector including a movable member; a support member for supporting the movable member; a magnet attached to one of the movable member and the support member; and a magnetic field detection element, arranged on the other one of the movable member and the support member, for detecting a magnetic field of the magnet, wherein a position of the movable member with respect to the support member is magnetically detected based on an intensity or a direction of the magnetic field detected by the magnetic field detection element; the magnet-holding structure comprising:

a magnet receptacle portion formed in a magnetically non-attractive portion of the movable member, for accommodating the magnet, wherein:

the magnet receptacle portion is defined by a magnetically non-attractive, non-adhesive material and the one of the movable member and the support member includes a magnetically attractive metal component or metal portion located near the magnet receptacle portion; and the magnet is magnetically held and positioned in the magnet receptacle portion, which is arranged between the magnet and the metal component or metal portion, solely by a magnetic attraction force produced between the magnet and the metal component or metal portion formed from the metal material.

2. A steering lock apparatus comprising:

a locked member;

a lock member that is engaged with and disengaged from the locked member;

a support member for supporting the lock member;

a magnet attached to one of the lock member and the support member;

a magnetic field detection element, arranged on the other one of the lock member and the support member, for detecting a magnetic field of the magnet, wherein a position of the lock member with respect to the support member is magnetically detected based on an intensity or a direction of the magnetic field detected by the magnetic field detection element; and a magnet receptacle portion, arranged on the one of the lock member and the support member, for accommodating the magnet;

wherein the magnet receptacle portion is defined by a magnetically non-attractive, non-adhesive material and the one of the lock member and the support member includes a metal component or metal portion formed from a metal material near the magnet receptacle portion; and the magnet is magnetically held and positioned in the magnet receptacle portion, which is arranged between the magnet and the metal component or metal portion, solely by a magnetic attraction force produced between the magnet and the metal component or metal portion formed from the metal material.

3. The steering lock apparatus according to claim 2, wherein relative positions of the component or portion formed from the metal material and the magnet are constant before and after the lock member moves with respect to the support member.

4. The steering lock apparatus according to claim 2, wherein the lock member includes:

a lock member that moves between a lock position at which the lock member is engaged with the locked member and an unlock position at which the lock member is disengaged from the locked member, with the lock member being formed from a metal material;

a stopper unit formed from a magnetically non-attractive material and supporting the lock member;

a biasing member, arranged between the stopper unit and the lock member, for biasing the lock member toward the lock position;

wherein the magnet receptacle portion is arranged on the stopper unit, and the magnet is magnetically attracted toward the lock member by its magnetic force and magnetically held and positioned in the magnet receptacle portion of the stopper unit.

5. The steering lock apparatus according to claim 2, further comprising:

an electric drive device; and a transmission mechanism for transmitting drive force of the electric drive device to the lock member and moving the movable lock assembly;

wherein the magnet is attracted toward a portion of one of the transmission mechanism, the lock member, and the support member that is formed from a metal material by a magnetic force of the magnet and is thereby magnetically held and positioned in the magnet receptacle portion by a magnetic attraction force produced between the magnet and the portion of one of the transmission mechanism, the lock member, and the support member.

6. The steering lock apparatus according to claim 2, wherein the lock member includes:

a lock member that moves between a lock position at which the lock member is engages with the locked member and an unlock position at which the lock member is disengaged from the locked member;

a magnetically non-attractive stopper unit for supporting the lock member; and a biasing member, arranged between the stopper unit and the lock member, for biasing the lock member toward a lock position;

wherein at least part of the lock member is formed from a metal material;

the magnet receptacle portion is arranged on the lock member; and the magnet is magnetically attracted toward the lock member by its magnetic force and magnetically held and positioned in the magnet receptacle portion of the stopper unit.

7. The steering lock apparatus according to claim 6, wherein:

the lock member is formed from a metal material;

the magnet receptacle portion is arranged near the lock member in the stopper unit; and the magnet is magnetically held and positioned in the magnet receptacle portion of the stopper unit by a magnetic attraction force produced between the lock member and the magnet.

8. The steering lock apparatus according to claim 6, wherein:

the lock member and the biasing member are formed from a metal material;

the magnet receptacle portion is arranged near the lock member and the biasing member in the stopper unit; and the magnet is magnetically held and positioned in the magnet receptacle portion of the stopper unit by a magnetic attraction force produced between the magnet and both of the lock member and the biasing member.

9. The steering lock apparatus according to claim 6, wherein:

the stopper unit includes an extension;

the locked member includes a valley;

the lock member includes a distal portion that is engageable with the valley of the locked member and a basal portion connected to the stopper unit;

the basal portion of the lock member is elastically connected to part of the extension of the stopper unit;

the lock member is movable with respect to the stopper unit;

the magnet receptacle portion is arranged near the basal portion of the lock member in the extension of the stopper unit; and the magnet is magnetically held and positioned in the magnet receptacle portion of the stopper unit by a magnetic attraction force produced between the basal portion and the magnet.

10. The steering lock apparatus according to claim 2, further comprising:

an electric drive device; and a transmission mechanism for transmitting drive force of the electric drive device to the lock member and moving the lock member.

11. The steering lock apparatus according to claim 10, wherein:

the lock member is formed from a metal material;

the magnet receptacle portion is arranged on the lock member;

distance between part of the lock member and the magnet is less than distance between the part of the lock member and the transmission mechanism; and the magnet is magnetically held and positioned in the magnet receptacle portion of the lock member by a magnetic attraction force produced between the magnet and the lock member.

12. The steering lock apparatus according to claim 10, wherein the lock member includes:

a lock member that moves between a lock position at which the lock member is engaged with the locked member and an unlock position at which the lock member is disengaged from the locked member;

a stopper unit, connected to the transmission mechanism, for supporting the lock member; and a biasing member, arranged between the stopper unit and the lock member, for biasing the lock member toward a lock position;

wherein at least part of the lock member is formed from a metal material;

the magnet receptacle portion is arranged near the lock member in the stopper unit;

distance between the magnet receptacle portion and the lock member is less than distance between the transmission mechanism and the lock member; and the magnet is attracted toward the lock member by magnetic force and magnetically held and positioned in the magnet receptacle portion of the stopper unit.

13. The steering lock apparatus according to claim 2, wherein the magnet accommodated and the magnet receptacle portion are uncovered during operation of the steering lock apparatus.

14. The steering lock apparatus according to claim 2, wherein the magnetic attraction force produced between the magnet and the metal component or metal portion is adjusted so that the magnet does not fall out of the magnet receptacle portion.

15. A steering lock apparatus for locking a steering shaft, the steering lock apparatus comprising:

a motor;

a lock assembly that is moved by the motor, wherein the lock assembly includes a lock bar that moves between a lock position at which the lock bar is engaged with the steering shaft and an unlock position at which the lock bar is disengaged from the steering shaft;

a magnet receptacle portion arranged on the lock assembly and defined by a magnetically non-attractive, non-adhesive material;

a magnet accommodated in the magnet receptacle portion and moved integrally with the lock assembly; and a magnetic field detection element for detecting a present position of the lock assembly based on a magnetic field of the magnet;

wherein the magnet is magnetically held and positioned in the magnet receptacle portion, which is arranged between the magnet and a magnetically attractive part of the lock assembly, solely by a magnetic attraction force produced between the magnet and the magnetically attractive part of the lock assembly.

16. The steering lock apparatus according to claim 15, wherein:

the lock assembly includes a magnetically attractive portion; and the magnet is held in the magnet receptacle portion by a magnetic attraction force produced between the magnet and the magnetically attractive portion of the lock assembly so that the magnet does not fall out of the magnet receptacle portion.

17. The steering lock apparatus according to claim 15, wherein:

the lock assembly includes a magnetically attractive portion;

the magnet receptacle portion is formed from a magnetically non-attractive material; and the magnet is held in the magnet receptacle portion by a magnetic attraction force produced between the magnet and the magnetically attractive portion of the lock assembly so that the magnet does not fall out of the magnet receptacle portion.

18. The steering lock apparatus according to claim 15, wherein the magnet and the magnet receptacle portion are uncovered during operation of the steering lock apparatus.

* * * * *